US009252628B2

(12) United States Patent
Leabman et al.

(10) Patent No.: US 9,252,628 B2
(45) Date of Patent: Feb. 2, 2016

(54) LAPTOP COMPUTER AS A TRANSMITTER FOR WIRELESS CHARGING (71) Applicant: Energous Corporation, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 212 days.

(21) Appl. No.: 14/104,503

(22) Filed: Dec. 12, 2013

(65) Prior Publication Data
US 2015/0171656 A1 Jun. 18, 2015

(51) Int. Cl.
*H02J 7/00* (2006.01)
*H02J 7/02* (2006.01)
*H02J 5/00* (2006.01)

(52) U.S. Cl.
CPC .................. *H02J 7/025* (2013.01); *H02J 5/005* (2013.01); *H02J 7/007* (2013.01)

(58) Field of Classification Search
CPC ...... Y02E 60/12; H02J 7/0044; H02J 7/0042; H02J 7/0045; H02J 7/025; H01M 2/1022; H01F 38/14; Y02T 90/122; B60L 11/182
USPC ......................................................... 320/114
See application file for complete search history.

(56) References Cited

U.S. PATENT DOCUMENTS

| | | | |
|---|---|---|---|
| 4,360,741 A | 11/1982 | Fitzsimmons et al. | |
| 5,712,642 A | 1/1998 | Hulderman | |
| 5,936,527 A | 8/1999 | Isaacman et al. | |
| 5,982,139 A | 11/1999 | Parise | |
| 6,127,799 A | 10/2000 | Krishnan | |
| 6,127,942 A | 10/2000 | Welle | |
| 6,289,237 B1 | 9/2001 | Mickle et al. | |
| 6,421,235 B2 * | 7/2002 | Ditzik .................. | G06F 1/1616 320/114 |
| 6,476,795 B1 * | 11/2002 | Derocher .............. | G06J 1/1616 320/114 |
| 6,615,074 B2 | 9/2003 | Mickle et al. | |
| 6,798,716 B1 | 9/2004 | Charych | |
| 6,856,291 B2 | 2/2005 | Mickle et al. | |

(Continued)

FOREIGN PATENT DOCUMENTS

| | | | |
|---|---|---|---|
| EP | 2545635 A2 | 1/2013 | |
| KR | 10 2013 0026977 A | 3/2013 | |

(Continued)

OTHER PUBLICATIONS

International Search Report dated Sep. 12, 2014 corresponding to International Patent Application No. PCT/US2014/037072, 3 pages.

(Continued)

*Primary Examiner* — Arun Williams
(74) *Attorney, Agent, or Firm* — Eric L. Sophir; Dentons US LLP (57) ABSTRACT Configurations and methods of wireless power transmission using a laptop computer may include a transmitter and/or a receiver embedded in the laptop screen. The embedded transmitter may emit RF waves for the generation of pockets of energy that may be utilized by receivers in peripheral devices for charging or powering. Meanwhile, the receiver embedded in the laptop computer may collect RF waves from a separate transmitter for charging or powering the laptop computer.

21 Claims, 7 Drawing Sheets

(56) References Cited

U.S. PATENT DOCUMENTS

| | | |
|---|---|---|
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0254503 A1 | 10/2011 | Widmer et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | Deluca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0207604 A1 | 8/2013 | Zeine |
| 2013/0241468 A1 | 9/2013 | Moshfeghi |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0176054 A1* | 6/2014 | Porat .................. H02J 7/025 320/108 |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0002086 A1* | 1/2015 | Matos .................. H02J 7/0052 320/108 |
| 2015/0011160 A1* | 1/2015 | Jurgovan .............. H04B 5/0031 455/41.1 |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0046526 A1* | 2/2015 | Bush .................... H04L 67/1095 709/204 |
| 2015/0102681 A1 | 4/2015 | Leabman et al. |
| 2015/0102769 A1 | 4/2015 | Leabman et al. |
| 2015/0115877 A1* | 4/2015 | Arai ...................... H02J 7/025 320/108 |
| 2015/0128733 A1* | 5/2015 | Taylor .................. H02J 7/025 73/865.8 |
| 2015/0130285 A1 | 5/2015 | Leabman et al. |

FOREIGN PATENT DOCUMENTS

| | | |
|---|---|---|
| WO | 99/52173 A2 | 10/1999 |
| WO | 03091943 A1 | 11/2003 |
| WO | 2004077550 A1 | 9/2004 |
| WO | 2008156571 A2 | 12/2008 |
| WO | WO2010022181 A1 | 2/2010 |
| WO | 2013035190 A1 | 3/2013 |

OTHER PUBLICATIONS ntemational Search Report dated Nov. 12, 2014 corresponding to International Patent Application No. PCT/US2014/046956, 4 pages.
ntemational Search Report dated Oct. 16, 2014 corresponding to International Patent Application No. PCT/US2014/041546, 4 pages.
ntemational Search Report dated Jan. 27, 2015 corresponding to International Patent Application No. PCT/US2014/037170, 4 pages.
ntemational Search Report dated Oct. 13, 2014 corresponding to International Patent Application No. PCT/US2014/041534, 4 pages.

* cited by examiner

LAPTOP COMPUTER AS A TRANSMITTER FOR WIRELESS CHARGING

CROSS-REFERENCES TO RELATED APPLICATIONS

The present disclosure is related to U.S. non-provisional patent application Ser. Nos. 13/891,430, filed May. 10, 2013, entitled "Methodology for Pocket-forming"; 13/925,469 filed Jun. 24, 2013, entitled "Methodology for Multiple Pocket-Forming"; 13/946,082, filed Jul. 19, 2013, entitled "Method for 3 Dimensional Pocket-forming"; 13/891,399, filed Jul. 22, 2013, entitled "Receivers for Wireless Power Transmission"; and 13/891,445, filed Jul. 22, 2013, entitled "Transmitters for Wireless Power Transmission".

FIELD OF INVENTION

The present disclosure relates in general to wireless power transmission, and more specifically to configurations and methods of wireless power transmission using a laptop or tablet computer.

BACKGROUND OF THE INVENTION

Laptop or tablet computers are often used in synchronization with several peripheral devices such as computer mice, keyboards, smartphones, headsets, and the like. These peripheral devices may include batteries for allowing wireless operation with the laptop or tablet computer. However, when charge is depleted, the batteries in these peripheral devices may have to be replaced, or said peripheral devices may need to connect to the laptop computer for charging. This may produce tedious continuous connecting/disconnecting of peripheral devices for charging, and may also require the use of all available USB ports in the laptop computer.

What is needed are methods and systems for allowing continuous wireless charging and operation of peripheral devices that may operate in conjunction with a laptop or tablet computer.

SUMMARY OF THE INVENTION

Configurations and methods of wireless power transmission using a laptop or tablet computer are disclosed. According to an embodiment, a transmitter may he embedded in the laptop computer screen for transmitting RF waves towards one or more peripheral devices, where these RF waves may generate pockets of energy that may allow the wireless charging of one or more peripheral devices. These peripheral devices may include a receiver for collecting and using the transmitted RF waves. Examples of peripheral devices may include headsets, computer keyboards and mice, smartphones, and the like.

A method for wireless power transmission to an electronic device from a computer system, comprising the steps of: embedding a pocket-forming transmitter in a screen display of the computer system; transmitting power RF waves, from the pocket forming transmitter having a radio frequency integrated circuit, antenna elements, a microprocessor and communication circuitry; generating pockets of energy from the transmitter to converge in 3-d space at predetermined locations; integrating a receiver having antenna elements and communicatio to the in n circuitry within the electronic device; converting the pockets of energy from the transmitter tegrated receiver to power the electronic device.

An apparatus for wireless power transmission to an electronic device from a computer system, comprising: a pocket-forming transmitter embedded in a screen display of the computer system having antenna elements, a RF circuit, a digital signal processor for controlling the RF circuit of the transmitter and communication circuitry connected to a power source of the computer system; power RF waves generated from the RF circuit in the transmitter to form pockets of energy; a receiver embedded in the electronic device with communication circuitry and antenna elements arranged in a predetermined array for capturing the pockets of energy converging in 3-D space at the receiver; a battery connected to the receiver for wirelessly charging the battery from the pockets of energy.

According to another embodiment, the laptop computer may include both, a transmitter and a receiver, for simultaneously transmitting and receiving RF waves. In this case, laptop computer may be wirelessly charged by a separate transmitter in proximity, while the laptop computer may also wirelessly charge one or more peripheral devices within range. Yet in another embodiment, the laptop computer may include a single transmitter that can also be used as a receiver. In this case, a software algorithm may be used to control the switching using same antenna elements for transmitting or receiving RF waves.

Laptop computer's screen may exhibit different configurations for integrating a transmitter or a receiver. In one embodiment, the transmitter may be integrated between the LED/LCD back-light layer and the frame, while the receiver may be integrated along the edges of the screen. Transmitter or receiver may be integrated in the front or back of the laptop screen as required by the application, using stand-alone components or shared screen components.

A method for wireless power transmission using a laptop computer may include the steps of selecting the appropriate transmitter within range, verifying battery charge levels in laptop computer, identifying peripheral devices available and within range, pocket forming generation and wireless charging.

The disclosed systems and methods for wireless power transmission using a laptop computer may allow seamless operation and wireless charging between one or more peripheral devices and the laptop computer, without the need of using physical cables or connections. Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION OF THE DRAWINGS

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket-forming to regulate power on one or more targeted receivers.

"Peripheral devices" may refer to electronics devices or accessories that can be used in conjunction with a laptop computer, where these electronics devices may include a receiver for collecting RF waves.

DESCRIPTION OF THE DRAWINGS

Figure 1:
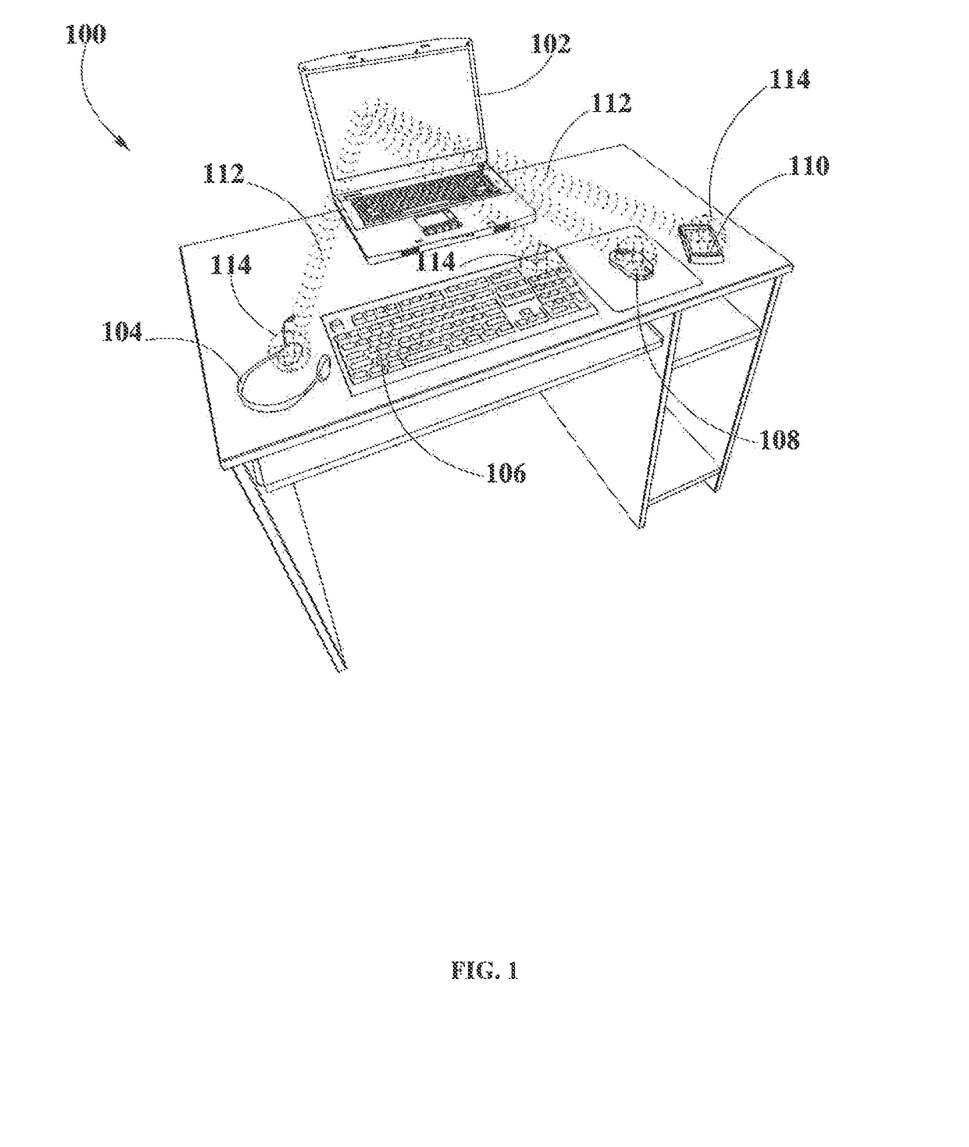
FIG. 1 illustrates a wireless power transmission for charging one or more peripheral devices using a laptop computer.

FIG. 1 illustrates a wireless power transmission 100 for charging one or more peripheral devices using a laptop computer 102 or tablet computer. Peripheral devices may include a headset 104, a keyboard 106, a mouse 108, and a smartphone 110, among others. These peripheral devices may operate wirelessly with laptop computer 102 through Bluetooth communication, and may include rechargeable batteries (not shown in FIG. 1).

A transmitter (not shown in FIG. 1) may be embedded in the laptop computer 102 screen to transmit controlled Radio Frequency (RF) waves 112 which may converge in 3-d space. These RF waves 112 may be controlled through phase and/or relative amplitude adjustments to form constructive and destructive interference patterns (pocket-forming). Pockets of energy 114 may be formed at constructive interference patterns and can be 3-dimensional in shape, while null-spaces may be generated at destructive interference patterns. A receiver (not shown in FIG. 1) embedded in each of the peripheral devices may then utilize pockets of energy 114 produced by pocket forming for charging or powering the batteries in peripheral devices.

According to some aspects of this embodiment, laptop computer 102 may be connected to a conventional AC plug for charge its battery to suitable levels, while providing wireless power transmission to one or more peripheral devices.

Figure 2:
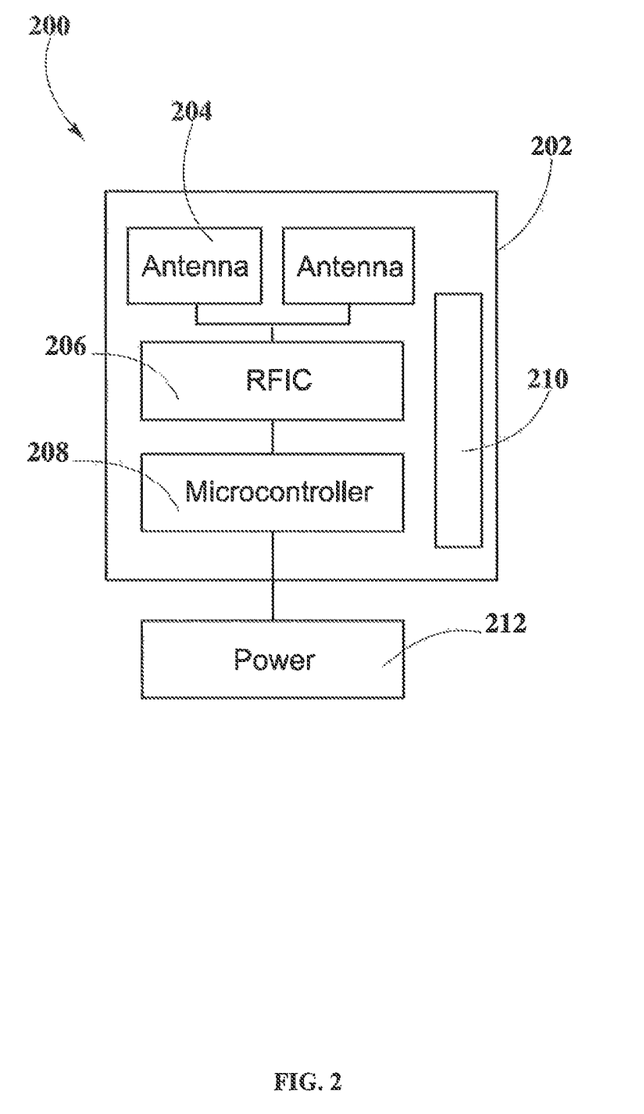
FIG. 2 shows a component level embodiment for a transmitter that may be embedded in laptop computer screen for the generation of wireless power transmission.

FIG. 2 illustrates a component level embodiment for a transmitter 200 that may be embedded in laptop computer 102 screen for the generation of wireless power transmission 100. Transmitter 200 may include a housing 202, at least two or more antenna elements 204, at least one RF integrated circuit (RFIC) 206, at least one digital signal processor (DSP) or micro-controller 208, and one communications component 210. Housing 202 can be made of any suitable material which may allow for signal or wave transmission and/or reception, for example plastic or hard rubber. Antenna. elements 204 may include suitable antenna types for operating in frequency bands such as 900 MHz, 2.4 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about ⅛ inches to about 8 inch and widths from about ⅛ inches to about 6 inch. Other antenna elements 204 types can be used, for example meta-materials, dipole antennas among others.

RFIC 206 may include a proprietary chip for adjusting phases and/or relative magnitudes of RF signals which may serve as inputs for antenna elements 204 for controlling pocket-forming. These RF signals may be produced using a power source 212 and a local oscillator chip (not shown) using a suitable piezoelectric material. Power source 212 may include the battery of laptop computer 102 which can be recharge using a conventional AC plug. Using communications component 210, micro-controller 208 may process information sent by the receivers embedded in peripheral devices through for determining optimum times and locations for pocket-forming. Communications component 210 may be based on standard wireless communication protocols which may include Bluetooth, or ZigBee. In addition, communications component 210 may be used to transfer other information such as an identifier for the device or user, battery level, location or other such information. Other communications component 210 may be possible, including radar, infrared cameras or sound devices for sonic triangulation of the device's position.

Figure 3:
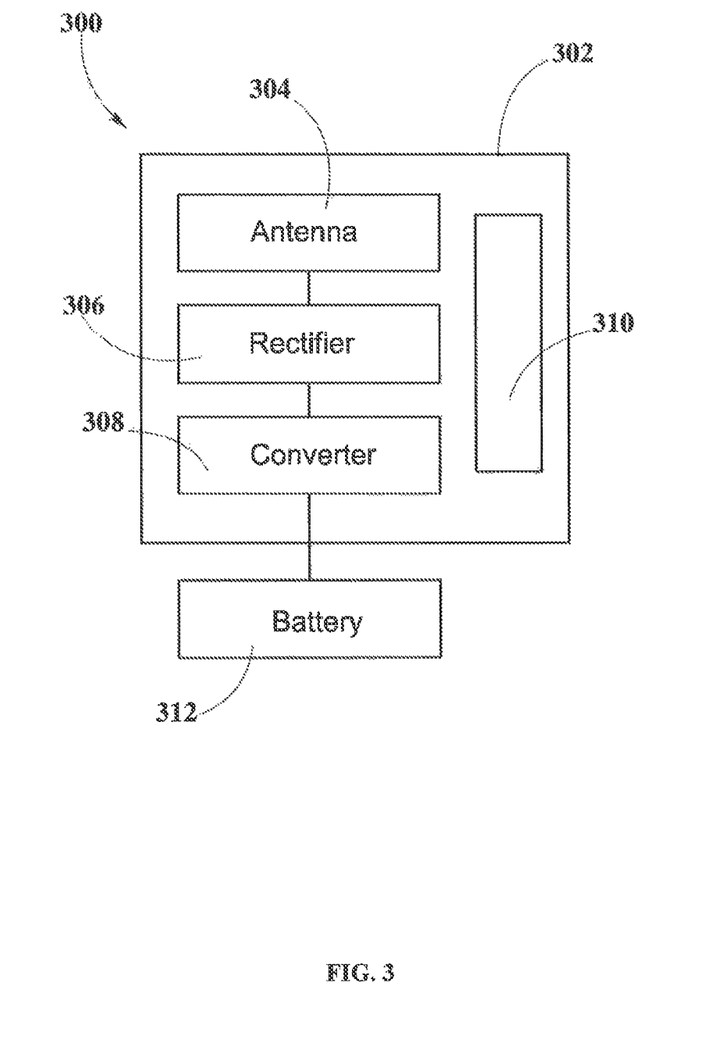
FIG. 3 depicts a component level embodiment of a receiver that may be embedded in peripheral devices or laptop computer for wireless powering or charging.

FIG. 3 illustrates a component level embodiment for a receiver 300 that may be embedded in peripheral devices or laptop computer 102 for wireless powering or charging. Receiver 300 may be integrated in peripheral devices and may include a housing 302 where at least one antenna element 304, one rectifier 306, one power converter 308 and a communications component 310 may be included. Housing 302 can be made of any suitable material which may allow for signal or wave transmission and/or reception, for example plastic or hard rubber. Housing 302 may be an external hardware that may be added to different electronic equipment, for example in the form of cases, or can be embedded within electronic equipment as well. Antenna element 304 may include suitable antenna types for operating in frequency bands similar to the bands described for transmitter 200 from FIG. 2. Antenna element 304 may include vertical or horizontal polarization, right hand or left hand polarization, elliptical polarization, or other suitable polarizations as well as suitable polarization combinations. Using multiple polarizations can be beneficial in peripheral devices where there may not be a preferred orientation during usage or whose orientation may vary continuously through time, for example smartphone 110. On the contrary, for devices with well-defined orientations, for example keyboard 106, there might be a preferred polarization for antennas which may dictate a ratio for the number of antennas of a given polarization. Suitable antenna types may include patch antennas with heights from about ⅛ inches to about 6 inch and widths from about ⅛ inches to about 6 inch. Patch antennas may have the advantage that polarization may depend on connectivity, i.e. depending on which side the patch is fed, the polarization may change. This may further prove advantageous as receiver 300 may dynamically modify its antenna polarization to optimize wireless power transmission 100.

Rectifier 306 may include diodes or resistors, inductors or capacitors to rectify the alternating current (AC) voltage generated by antenna element 304 to direct current (DC) voltage. Rectifier 306 may be placed as close as is technically possible to antenna element 304 to minimize losses. After rectifying AC voltage, DC voltage may be regulated using power converter 308. Power converter 308 can be a DC-DC converter which may help provide a constant voltage output to charge the batteries 312 of peripheral devices. Typical voltage outputs can be from about 5 volts to about 10 volts. In some embodiments, power converter 308 may include electronic switched mode DC-DC converters which can provide high efficiency. In such a case, a capacitor (not shown) may be included before power converter 308 to ensure sufficient current is provided. Lastly, a communications component 310, similar to that of transmitter 200 from FIG. 2, may be included in receiver 300 to communicate with a transmitter 200 or to other electronic equipment.

Figure 4:
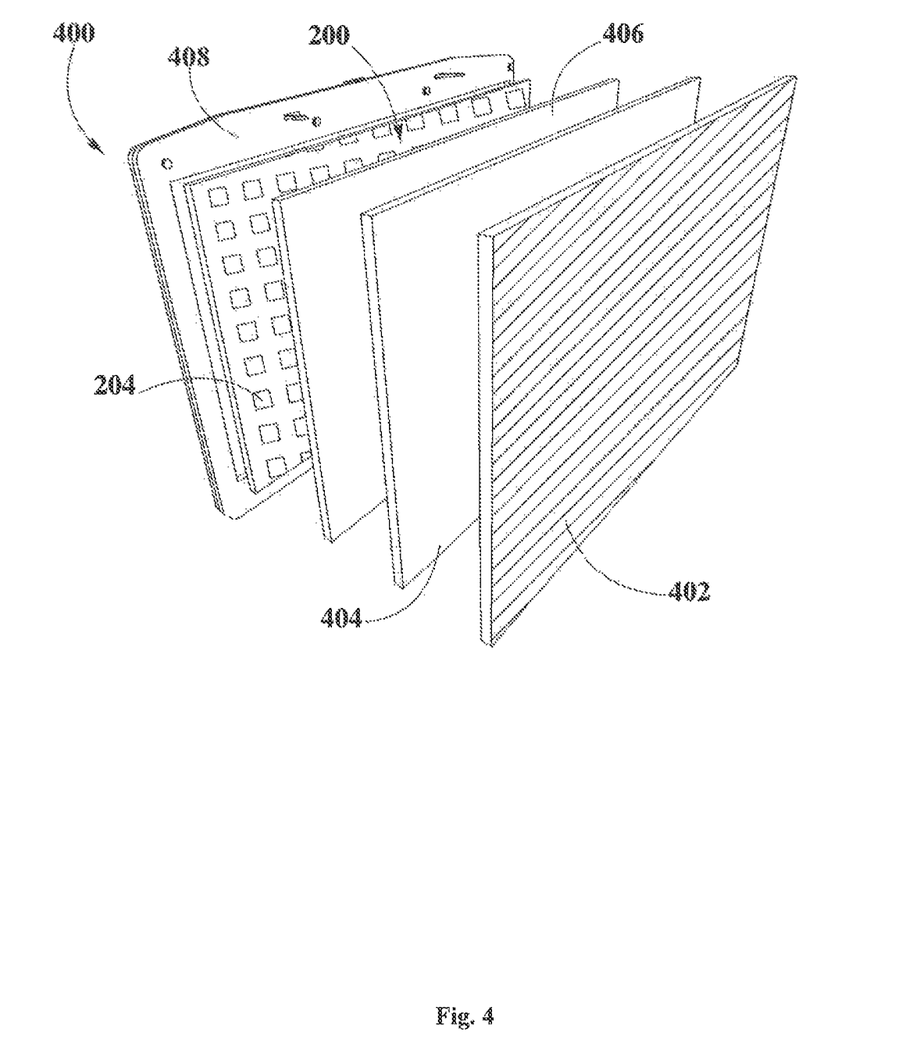
FIG. 4 illustrates an exploded view of a laptop screen configuration that may be used in the wireless power transmission shown in FIG. 1.

FIG. 4 illustrates an exploded view of a laptop screen configuration 400 used in wireless power transmission 100. In this particular laptop screen configuration 400, transmitter 200 may be embedded in laptop computer 102 for the transmission of RF waves 112 towards one or more peripheral devices, as shown in FIG. 1.

Laptop computer 102 screen may he formed of different layers, including a front transparent screen layer 402, a polarized film layer 404, a LED/LCD back-light layer 406, and a frame 408. According to some aspects of this embodiment, transmitter 200 may he integrated in laptop computer 102 screen, specifically between LED/LCD back-light layer 406 and frame 408. As shown in FIG. 4, transmitter 200 may include a plurality of antenna elements 204 facing out of laptop computer 102 screen. This configuration of antenna elements 204 may allow suitable transmission of RF waves 112 towards peripheral devices that may be located in front of laptop computer 102 screen. In other embodiments, transmitter 200 may be embedded in the circuitry elements or metal mesh (touchscreen versions) of laptop computer 102 screen.

Figure 5:
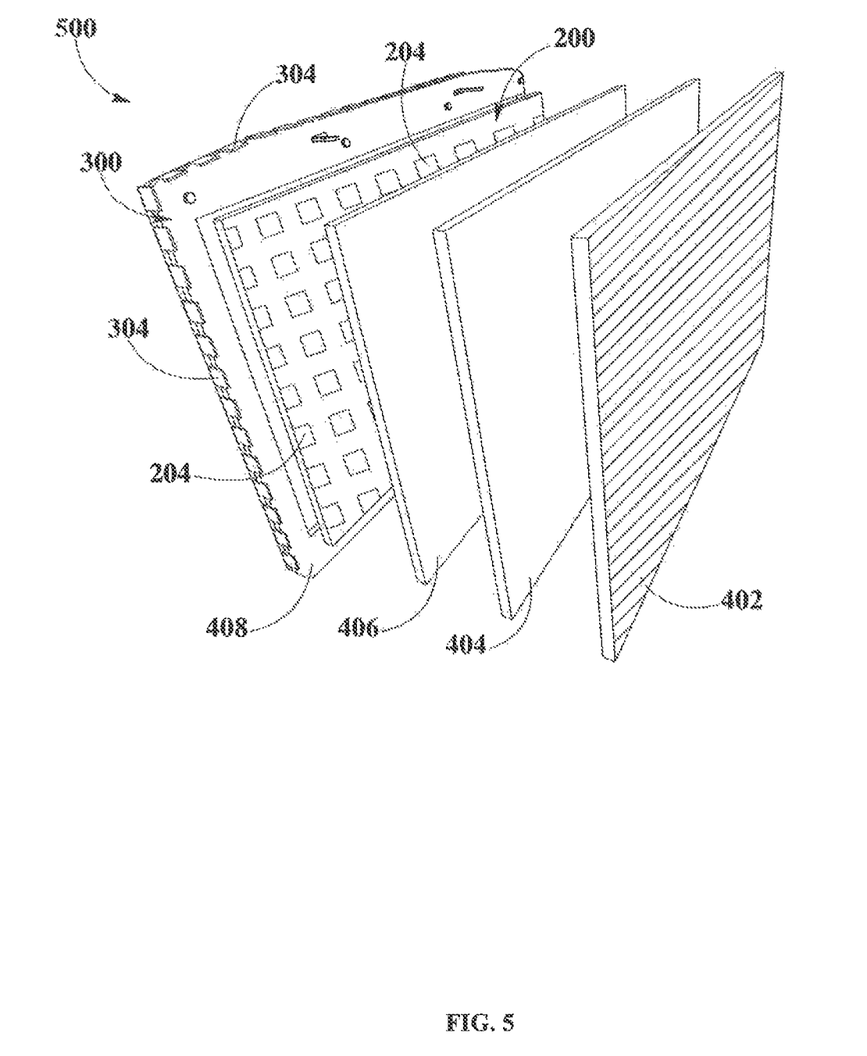
FIG. 5 shows an exploded view of another laptop screen configuration which may include both, a transmitter and a receiver.

FIG. 5 shows an exploded view of another laptop screen configuration 500 where laptop computer 102 screen may include both, transmitter 200 and receiver 300, for providing and receiving wireless charging.

Similarly as in FIG. 4, laptop computer 102 screen may be formed of different layers, including front transparent screen layer 402, polarized film layer 404, LED/LCD back-light layer 406, and frame 408. According to some aspects of this embodiment, transmitter 200 may be integrated between LED/LCD back-light layer 406 and frame 408, while receiver 300 may be integrated along frame 408. As shown in FIG. 5, antenna elements 204 of transmitter 200 may be pointing out of the screen, while antenna elements 304 of receiver 300 may be embedded around the edges of frame 408 for allowing the reception of RF waves 112 from RF waves 112 sources or transmitters at different locations.

The location and configuration of transmitter 200 and receiver 300 in laptop computer 102 screen may vary according to the application. For example, in one embodiment, receiver 300 may be configured in the middle of the back of frame 408 and may include high directional antenna elements 304 that can be oriented towards a transmitter in proximity to laptop computer 102 for receiving suitable wireless charging. In another embodiment, laptop computer 102 screen may include a single transmitter 200 that may also operate as a receiver 300, in which case, transmitter 200 may use same antenna elements 204 for transmitting and receiving RF waves 112. That is, transmitter embedded in laptop computer 102 screen may switch between those antenna elements 204 receiving RF waves 112 for charging the battery of laptop computer 102 or transmitting RF waves 112 for charging the batteries in peripheral devices. An algorithm processed at micro-controller 208 may be used to control the switching between transmitting and receiving RF waves 112 using same antenna elements 204.

Figure 6:
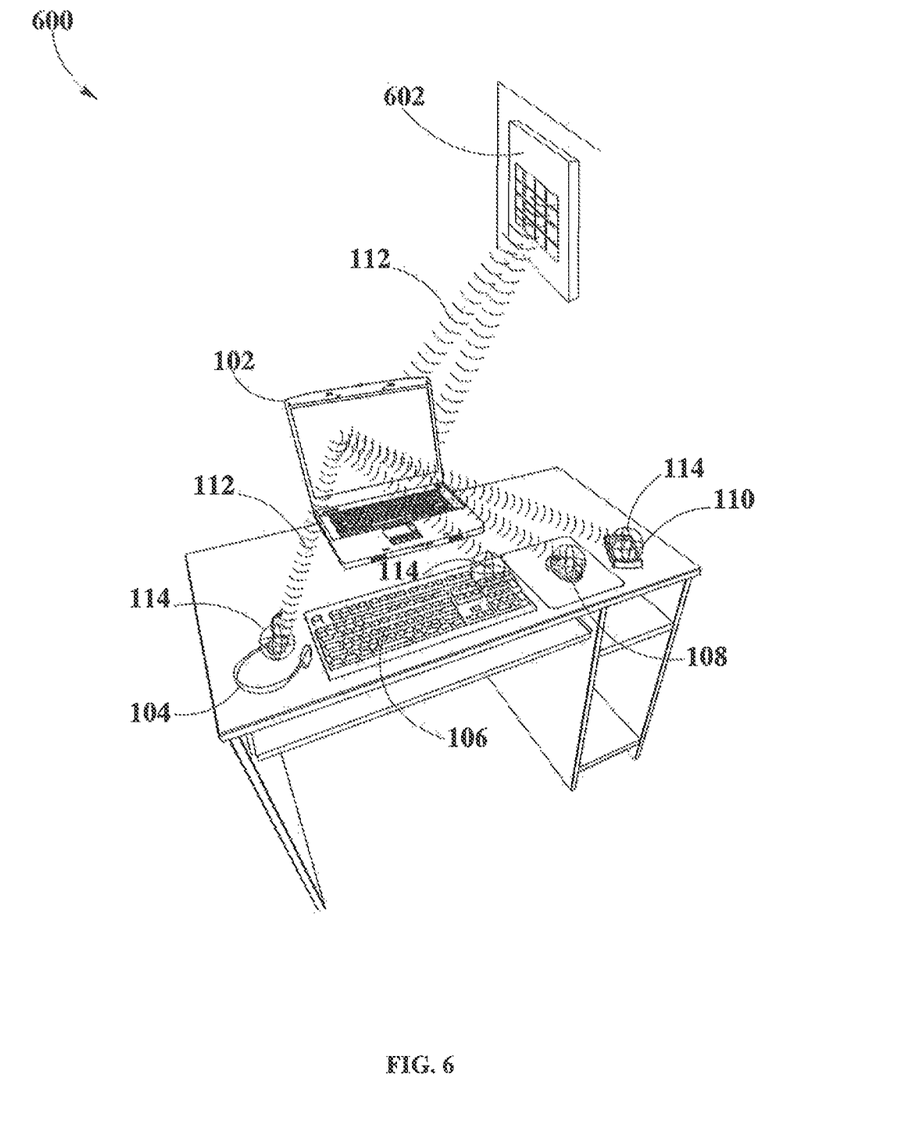
FIG. 6 depicts an example of wireless power transmission where a laptop computer may use the laptop screen configuration shown in FIG. 5 for simultaneously receiving and transmitting RF waves.

FIG. 6 shows another example of wireless power transmission 600 where laptop computer 102 may use laptop screen configuration 500 for simultaneously receiving and transmitting RF waves 112.

According to some aspects of this embodiment, one or more separate transmitters 602 may direct RF waves 112 towards the edges of laptop computer 102 screen where antenna elements 304 of receiver 300 may be integrated (not shown in FIG. 6). Consequently, pockets of energy 114 may be captured by antenna elements 304 and utilized by the receiver 300 to charge the battery of laptop computer 102. Simultaneously, transmitter 200 (not shown in FIG. 6), also embedded in laptop computer 102, may direct RF waves 112 towards one or more peripheral devices.

Transmitter 602 may exhibit similar configuration as transmitter 200 shown in FIG. 2. However, transmitter 602 may exhibit a larger footprint as it may not be limited by the size of a computer screen, and it may also include a higher amperage power source 212 such as a standard 120/220 volts AC house connection compared to transmitter 200 which may obtain power from the battery of laptop computer 102. This may allow transmitter 602 to have a wider wireless charging range compared to transmitter 200.

Peripheral devices such as headset 104, keyboard 106, mouse 108, and smartphone 110 may be wirelessly charged by RF waves 112 emitted from transmitter 200 in laptop computer 102. In addition, these peripheral devices may also be wirelessly Charged directly by RF waves 112 emitted from one or more transmitters 602 in proximity to laptop computer 102. In this case, an algorithm processed at micro-controller 208 may coordinate the operation between transmitter 200 embedded in laptop computer 102 screen and transmitter 602 positioned on the room walls. For example, this algorithm may decide which transmitter, transmitter 200 or transmitter 602, should be sending RIF waves 112 to wirelessly charge peripheral devices, depending on the proximity and/or energy levels of the battery in laptop computer 102. In one embodiment, both, transmitter 200 and transmitter 602, may simultaneously direct RF waves 112 towards peripheral devices for increasing power transfer, if required by the application.

Figure 7:
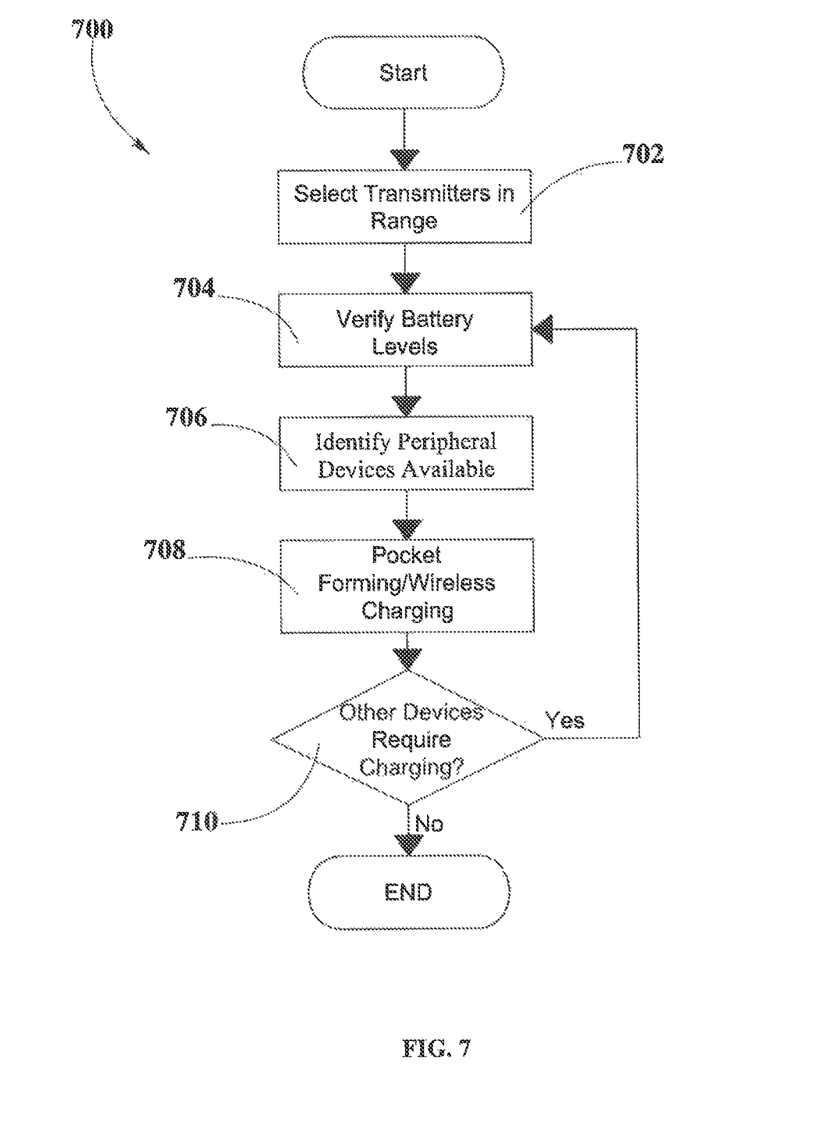
FIG. 7 illustrates a simplified flowchart of a wireless power transmission process that may be implemented for charging one or more peripheral devices using a laptop computer.

FIG. 7 shows a simplified flowchart of a wireless power transmission process 700 that may be implemented for charging one or more peripheral devices using laptop computer 102, This process may be applicable to the embodiments of wireless power transmission 100, 600 shown in FIG. 1 and FIG. 6.

Wireless power transmission process 700 may begin by selecting one or more transmitters in range, at block 702. One or more peripheral devices may require wireless charging, in which case, one or more transmitters 602 in the room, or transmitter 200 embedded in laptop computer 102 may be selected if they are within a suitable range. For example, if smartphone 110 is not within a suitable charging distance from laptop computer 102 (e.g. not in the table), then the higher power transmitter 602 may be selected for providing wireless charging. According to some embodiments, wireless charging distance for transmitter 200 in laptop computer 102 may be optimized within a range of about 1 to 3 meters; if peripheral devices are outside this range, then they can be wirelessly charge by transmitter 602.

Laptop computer 102 may also include a software application that may provide information about the distance, charging levels, efficiency, location, and optimum positioning of laptop computer 102 with respect to peripheral devices and transmitter 602.

After selecting the transmitter within the optimal charging range, wireless power transmission process 700 may continue by chocking the charge levels of the battery in laptop computer 102, at block 704. This check may be performed by a control module included in laptop computer 102 (not shown in FIG. 1 and FIG. 6) or by micro-controller 208 in transmitter 200. Different charging levels for the battery in laptop computer 102 may be established for maintaining suitable wireless charging. For example, minimum and maximum charging thresholds may be established at about 25% and 99% of total charge respectively. That is, if battery charge is below the minimum threshold or 25%, then laptop computer 102 can be connected to a standard 120/220 AC volts outlet or it may receive wireless charging from transmitter 602. When battery charge is at 99% or at least above 2.5%, laptop computer 102 may transmit RF waves 112 for one or more peripheral devices in range.

Wireless power transmission process 700 may continue at block 706, where communications component 210 in transmitter 200 or transmitter 602 may identify one or more peripheral devices that may require wireless charging. Charging or powering priorities and other parameters such as power intensity and pocket-forming focus/timing may be established using a control module included in laptop computer 102 (not shown in FIG. 4 and FIG. 5) or microcontroller 208 in transmitters 200, 602. For example, based on charging or powering priorities, transmitter 200 or transmitter 602 may be configured to first provide wireless charging to mouse 108, followed by keyboard 106, and lastly to headsets 104.

After peripheral are identified and charging priorities/parameters in transmitter 200 or transmitter 602 are set, transmission of RF waves 112 towards the designated peripheral devices can begin, at block 708, where these RF waves 112 may generate pockets of energy 114 at receivers 300 for powering or charging one or more peripheral devices, sequentially or simultaneously.

Using communications component 210, transmitter 200 embedded in laptop computer 102 or transmitter 602 on the wall may continuously check if there are other peripheral devices that may require wireless charging or powering, at block 710. If new or additional peripheral devices are identified, then transmitter 200 or transmitter 602 may wirelessly charge the identified peripheral devices according to the established charging priorities, optimum ranges, battery levels and/or other parameters. If no further peripheral devices are recognized or need wireless charging, then wireless power transmission process 700 may end.

While various aspects and embodiments have been disclosed, other aspects and embodiments are contemplated. The various aspects and embodiments disclosed are for purposes of illustration and are not intended to be limiting, with the true scope and spirit being indicated by the following claims.

Having thus described the invention, We claim:

1. A method for wireless power transmission to an electronic device from a computer system, comprising the steps of:
    embedding a pocket-forming transmitter in a screen display of the computer system;
    transmitting power RF waves from the pocket-forming transmitter having a radio frequency integrated circuit, antenna elements, a microprocessor and communication circuitry;
    generating pockets of energy from the transmitter to converge in 3-d space at predetermined locations;
    integrating a receiver having antenna elements and communication circuitry within the electronic device;
    converting the pockets of energy from the transmitter to the integrated receiver to power the electronic device.

2. The method for wireless power transmission to an electronic device from a computer system of claim 1, wherein the computer system is a laptop, notebook or nano-notebook.

3. The method for wireless power transmission to an electronic device from a computer system of claim 1, wherein the computer system is a desktop computer, a tablet, iPad, iPhone, smartphone or other peripheral portable electronic devices.

4. The method for wireless power transmission to an electronic device from a computer system of claim 1, wherein the computer system includes an embedded receiver whereby a separate transmitter in proximity to the computer system powers the computer system while the transmitter of the computer system wirelessly charges the electronic device.

5. The method for wireless power transmission to an electronic device from a computer system of claim 4, further including the step of switching between the transmitter and the receiver in the computer system.

6. The method for wireless power transmission to an electronic device from a computer system of claim 5, further including the step of controlling the switching by a software algorithm.

7. The method for wireless power transmission to an electronic device from a computer system of claim 4, further including the step of using the same antenna elements for transmitting and receiving the power RF waves.

8. The method for wireless power transmission to an electronic device from a computer system of claim 1, further including the step of synchronizing wirelessly with at least one peripheral electronic device used with the computer system and the step of powering the at least one peripheral electronic device.

9. The method for wireless power transmission to an electronic device from a computer system of claim 8, wherein the at least one peripheral electronic device includes computer mice, keyboards, smartphones, audio or visual headsets and other peripherals used with a computer system.

10. The method for wireless power transmission to an electronic device from a computer system of claim 1, wherein the transmitter is integrated between a LED/LCD back-light layer and a frame of the screen display.

11. The method for wireless power transmission to an electronic device from a computer system of claim 4, further including the steps of selecting the separate transmitter within a predetermined charging range of the computer system; verifying a battery charge level of the computer system; charging the computer system; identifying peripheral devices within a predetermined range of the computer system transmitter for wirelessly charging the peripheral devices.

12. The method for wireless power transmission to an electronic device from a computer system of claim 1, wherein the wireless power transmission from the computer system allows seamless operation and wireless charging between at least one peripheral device and the computer system.

13. The method for wireless power transmission to an electronic device from a computer system of claim 1, wherein the computer system transmitter includes adaptive pocket-forming for dynamically adjusting pocket-forming to regulate power on the receiver of at least one peripheral electronic device within predetermined range of the transmitter through communication signals between the transmitter and receiver communication circuitry.

14. The method for wireless power transmission to an electronic device from a computer system of claim 1, wherein the electronic device includes peripheral devices used in conjunction with the computer system that include a receiver with antenna elements for collecting the power RF waves for charging the peripheral devices.

15. The method for wireless power transmission to an electronic device from a computer system of claim 1, wherein the antenna elements of the transmitter and receiver operate in frequency bands of 900 MHz, 2.4 GHz, 5.8 GHz.

16. The method for wireless power transmission to an electronic device from a computer system of claim 1, wherein peripheral devices operate wirelessly with the computer system through Bluetooth communication between the communication circuitry of the transmitter and receiver.

17. The method for wireless power transmission to an electronic device from a computer system of claim 1, wherein the antenna elements are facing out of the computer system screen display to allow suitable transmission of power RF waves to the electronic device.

18. The method for wireless power transmission to an electronic device from a computer system of claim 1, wherein the screen display includes both the transmitter and a receiver for providing charging to the computer system and charging to the electronic device by switching between the transmitter and receiver over the antenna elements of the computer system.

19. An apparatus for wireless power transmission to an electronic device from a computer system, comprising:
a pocket-forming transmitter embedded in a screen display of the computer system having antenna elements, a RF circuit, a digital signal processor for controlling the RF circuit of the transmitter and communication circuitry connected to a power source of the computer system;
power RF waves generated from the RF circuit in the transmitter to form pockets of energy;
a receiver embedded in the electronic device with communication circuitry and antenna elements arranged in a predetermined array for capturing the pockets of energy converging in 3-D space at the receiver;
a battery connected to the receiver for wirelessly charging the battery from the pockets of energy.

20. The apparatus for wireless power transmission to an electronic device from a computer system of claim 1, further including a receiver with communication circuitry integrated into the screen display wherein the transmitter and receiver simultaneously receive and transmit power RF waves for charging the computer system through the receiver and for charging the electronic device through the transmitter whereby a software algorithm processed by the digital processor is used to control the switching between the transmitter and the receiver in the screen display using the same antenna. elements for both transmitting and receiving power RF waves through the respective communication circuitry utilizing Bluetooth, infrared, Wi-Fi, FM radio or Zigbee signals for the various communication protocols between the receiver and the transmitter to regulate the charging of the computer system and the electronic device.

21. The apparatus for wireless power transmission to an electronic device from a computer system of claim 20, wherein the digital signal processor in the transmitter of the computer system controls the charging levels of a battery in the computer system to maintain suitable wireless minimum and maximum charging thresholds between computer battery charge levels of approximately 25% and 99% for charging the electronic device within a predetermined charging range before connecting the computer system to a standard 120/220 AC outlet whenever the computer battery level falls below the 25% battery threshold level.

* * * * *